(12) United States Patent
Valembois

(10) Patent No.: US 8,925,880 B2
(45) Date of Patent: Jan. 6, 2015

(54) COMPOSITE L-SHAPED FITTING AND METHOD AND MOULD FOR THE PRODUCTION THEREOF

(75) Inventor: Guy Valembois, Toulouse (FR)

(73) Assignee: SKF Aerospace France, Saint Vallier (FR)

( * ) Notice: Subject to any disclaimer, the term of this patent is extended or adjusted under 35 U.S.C. 154(b) by 462 days.

(21) Appl. No.: 13/141,806

(22) PCT Filed: Dec. 17, 2009

(86) PCT No.: PCT/FR2009/052599
§ 371 (c)(1),
(2), (4) Date: Jun. 23, 2011

(87) PCT Pub. No.: WO2010/072952
PCT Pub. Date: Jul. 1, 2010

(65) Prior Publication Data
US 2011/0272536 A1   Nov. 10, 2011

(30) Foreign Application Priority Data

Dec. 24, 2008   (FR) ..................................... 08 59056

(51) Int. Cl.
| | | |
|---|---|---|
| *F16M 11/00* | (2006.01) | |
| *B29C 70/34* | (2006.01) | |
| *B29C 33/48* | (2006.01) | |
| *B29L 31/30* | (2006.01) | |
| *B64C 1/00* | (2006.01) | |

(52) U.S. Cl.
CPC ............. *B29C 70/345* (2013.01); *B29C 33/485* (2013.01); *B29L 2031/3082* (2013.01); *B64C 2001/0072* (2013.01); *Y02T 50/433* (2013.01); *Y02T 50/43* (2013.01)

USPC ............... 248/200; 248/300; 52/698; 52/712; 134/134

(58) Field of Classification Search
CPC ............... F16M 13/02; E04H 17/1421; B64C 2001/0072; Y02T 50/43; Y02T 50/433; B29L 2031/3082; B29C 33/485; B29C 70/345
USPC ............. 248/220.31, 220.41, 220.42, 220.43, 248/200, 300, 351; 52/698, 712; 134/134
See application file for complete search history.

(56) References Cited

U.S. PATENT DOCUMENTS

| | | | | |
|---|---|---|---|---|
| 491,091 | A | * | 2/1893 | Drake ........................... 122/510 |
| 1,916,435 | A | | 7/1933 | Ott et al. |
| 3,981,474 | A | * | 9/1976 | Szilagyi ........................ 248/487 |
| 4,067,168 | A | * | 1/1978 | Thurner .......................... 52/854 |
| 4,273,477 | A | * | 6/1981 | Murphy .......................... 406/39 |

(Continued)

FOREIGN PATENT DOCUMENTS

| | | |
|---|---|---|
| DE | 42 34 002 A1 | 4/1994 |
| FR | 2 717 735 A1 | 9/1995 |
| GB | 2 44 645 A | 6/2008 |

*Primary Examiner* — Nkeisha Smith
(74) *Attorney, Agent, or Firm* — Andrew W. Chu; Craft Chu PLLC

(57) ABSTRACT

The invention relates to an L-shaped fitting obtained after molding a composite material, including two portions defining an angle therebetween and having holes formed therein for connecting the two portions using an attachment device, and having side reinforcements in the form of brackets. At least one portion has a concave curved profile on the inner side of the fitting, and the hole(s), formed in the portion having a concave curved profile on the inner side are each formed along an axis radial to the curvature.

8 Claims, 4 Drawing Sheets

(56) References Cited

U.S. PATENT DOCUMENTS

| | | | |
|---|---|---|---|
| 4,593,870 A * | 6/1986 | Cronkhite et al. | 244/117 R |
| 4,709,897 A * | 12/1987 | Mooney | 248/551 |
| 4,854,533 A * | 8/1989 | Sainato | 248/220.42 |
| 4,998,304 A * | 3/1991 | Sauter et al. | 4/559 |
| 5,323,917 A * | 6/1994 | Johnson et al. | 211/74 |
| 7,014,383 B2 * | 3/2006 | Schmid et al. | 403/231 |
| 7,226,025 B2 * | 6/2007 | Sato et al. | 248/200 |
| 7,226,027 B1 * | 6/2007 | Feeley | 248/220.1 |
| 7,523,906 B2 * | 4/2009 | Bennett | 248/288.51 |
| 8,044,988 B2 * | 10/2011 | Peters et al. | 347/257 |
| 8,376,275 B2 * | 2/2013 | Bolukbasi et al. | 244/119 |
| 8,540,201 B2 * | 9/2013 | Gadd et al. | 248/300 |
| 2002/0070322 A1 * | 6/2002 | Zambelli et al. | 248/200 |
| 2003/0178326 A1 * | 9/2003 | Belyakov et al. | 206/77.1 |
| 2003/0178540 A1 * | 9/2003 | Ledingham | 248/214 |
| 2006/0260259 A1 * | 11/2006 | Morse | 52/698 |
| 2007/0221803 A1 * | 9/2007 | Jouett et al. | 248/309.1 |
| 2007/0245677 A1 * | 10/2007 | Nguyen et al. | 52/698 |
| 2009/0173036 A1 * | 7/2009 | Hand | 52/715 |
| 2009/0193750 A1 * | 8/2009 | Klima | 52/712 |
| 2010/0031601 A1 * | 2/2010 | Lin | 52/712 |
| 2012/0247059 A1 * | 10/2012 | Daudet et al. | 52/705 |

\* cited by examiner

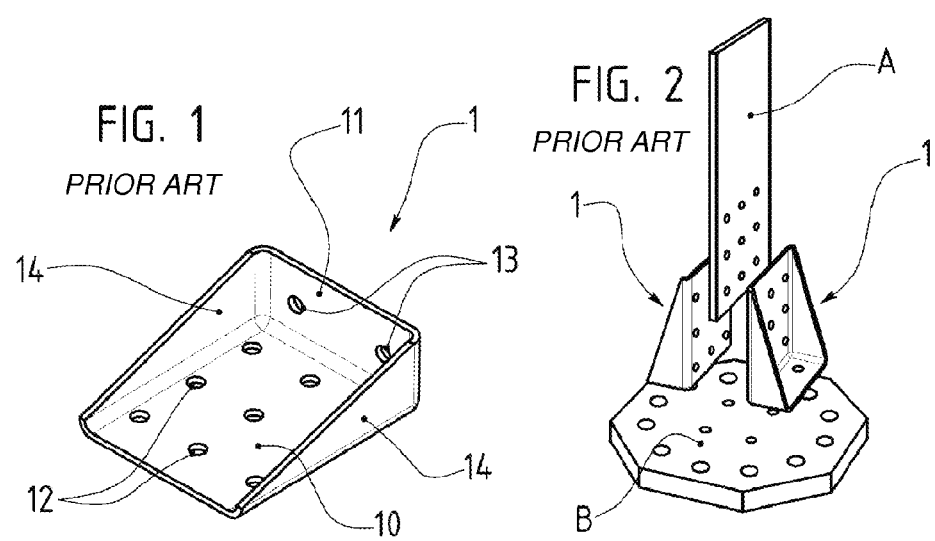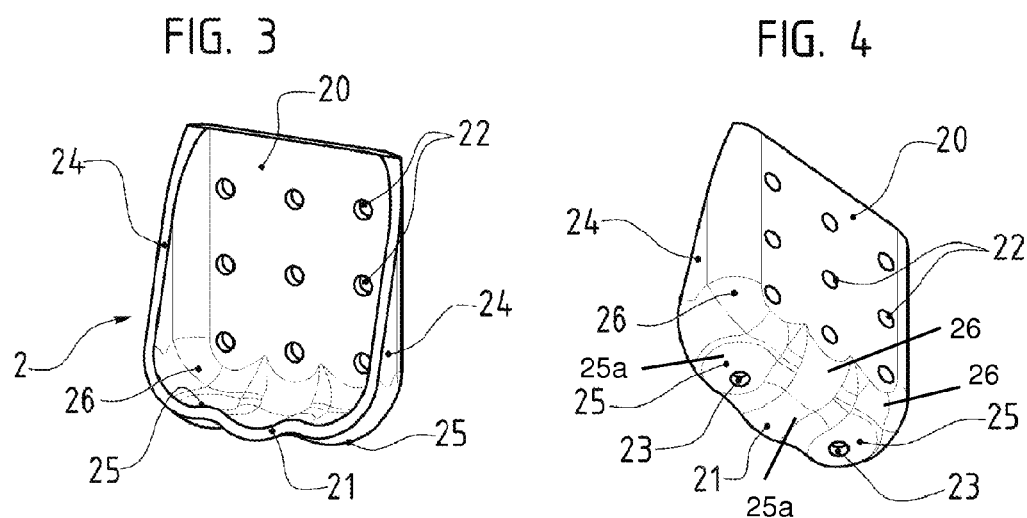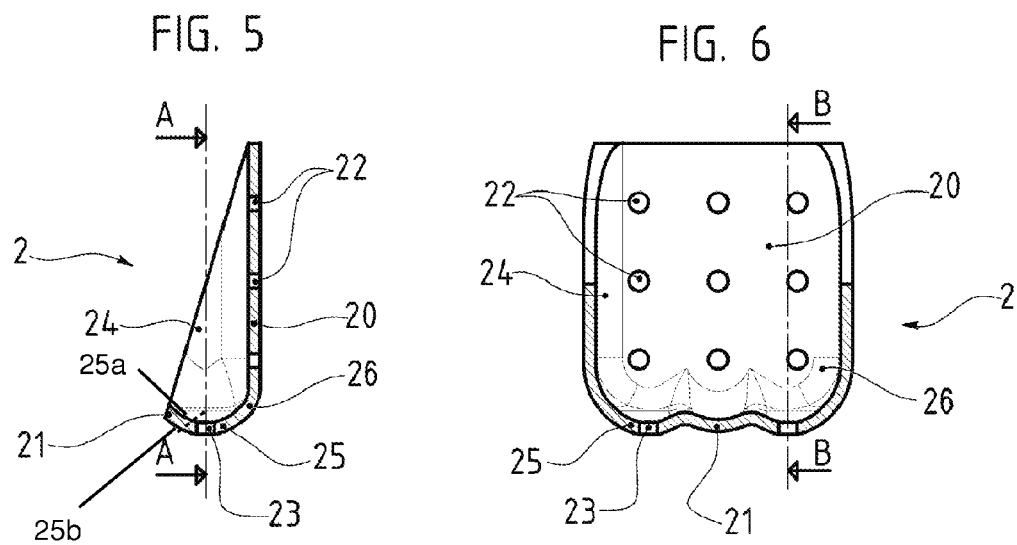

United States Patent

COMPOSITE L-SHAPED FITTING AND METHOD AND MOULD FOR THE PRODUCTION THEREOF

BACKGROUND OF THE INVENTION (1) Field of the Invention

The object of the present invention is an L-shaped fitting obtained after molding a composite material, as well as the method for the production thereof and the mold for implementing said method.

(2) Description of the Prior Art

FIG. 1 of the attached drawing represents an L-shaped fitting 1 made out of composite material presently used, namely in the field of aeronautics, for assembling parts. This fitting 1 is obtained after molding a composite material, it essentially includes two portions 10 and 11 forming between them an angle, in this case a right angle, having holes 12 and 13, respectively, formed therein in order to allow making them integral, and at right angles by means of side reinforcements 14.

Such a fitting 1 is aimed, as shown in FIG. 2, at being used pairwise for assembling and fixing two parts A and B, one of which is perpendicular to the other one, one of both parts, A, being enclosed by two fittings 1, the whole being made integral through fixing means, not shown, such as studs.

These fittings 1 are subjected to tensile and compression forces, and they must therefore meet strict specifications; however, because they are made out of composite material, these fittings are subjected, during their stress, to bending deformations, which generate a delamination of the fibers.

Such fittings are described in GB 2 444 645, one made out of metal and the other one made out of composite material. These two fittings essentially differ in that the one made out of composite material has walls provided with extra thicknesses aimed at reinforcing the structure, so as to try to cope with the drawbacks related to the selection of material.

The solution consisting in making the walls thicker permits to increase only slightly the strength of the structure, while exhibiting other drawbacks such as an increase in size and weight of the fitting.

SUMMARY OF THE INVENTION

The present invention is aimed at providing an L-shaped fitting obtained after molding of a composite material the new design of which permits not only to meet the above-mentioned specifications, but also to cope with the drawbacks of deterioration when it is stressed in traction or compression, and without exhibiting the drawbacks related to the addition of material.

The L-shaped fitting obtained after molding a composite material, according to the invention, comprises two portions forming between them an angle, having holes formed therein for permitting to make two parts integral through fixing means, and at right angles by means of side reinforcements, and it is essentially characterized in that at least one of said two portions has, on the inner side of the fitting, a concave curved profile, and in that the hole or holes, provided for in the portion or portions having on the inner side a concave curved profile, are each made according to an axis radial to the curvature.

According to an additional feature of the inventive L-shaped fitting, the area for connecting the two portions has, on the inner side, a concave curved profile.

According to another additional feature of the inventive L-shaped fitting, the side reinforcements have a concave bent profile on the inner side.

According to another additional feature of the inventive L-shaped fitting, at least one of the portions has a flat coupling outer face.

This feature namely permits to increase the compression strength, in particular, but not restrictively, when the direction of the compression force is substantially constant and perpendicular to the flat coupling face.

According to another additional feature of the inventive L-shaped fitting, the flat coupling outer face of one of the portions consists of the outer face of an element molded on said externally convex portion.

The wall of the fitting at the level of the area with curved profile permits to transmit the forces into the composite material, while avoiding inter-laminar shearing and traction.

It should be noted that the interfaces at the level of the hole or holes provided for in an area with a spherical or cylindrical profile, namely when the coupling faces are not flat, are made through spherical or cylindrical bearing elements, such as washers with an adapted shape.

The method for producing the inventive L-shaped fitting obtained after molding of a composite material consists in performing the following successive steps:

arranging on the inner walls of the hollow cavity of a mold reproducing the outer shape to be conferred to said L-shaped fitting pre-impregnated fibers in the form of fabrics or mats, inserting into said cavity a varying-geometry core, developing said core until it adopts externally the inner shape of said L-shaped fitting, applying special pressure and/or temperature conditions, so as to bring about the polymerization of said composite material.

The mold permitting the implementation of the method for producing the inventive L-shaped fitting is essentially characterized in that it comprises a portion comprising a hollow cavity reproducing the outer shape of said L-shaped fitting, a second portion or core formed of the association of several elements, designed capable of sliding against each other through oblique surfaces, at least one of said elements forming a wedge so as to permit, during its insertion, to deform said core so that it has externally the inner shape of said L-shaped fitting.

The advantages and features of the inventive fitting will become clear from the following description, which refers to the attached drawing, which represents a non-restrictive embodiment of same.

BRIEF DESCRIPTION OF THE DRAWING

In the attached drawing:

FIG. 1 represents a schematic and perspective view of an L-shaped fitting of the state of the art, FIG. 2 represents a schematic, perspective and exploded view of a mounting using L-shaped fittings of the state of the art, FIG. 3 represents a schematic and perspective view of an L-shaped fitting according to the invention, FIG. 4 represents a schematic and perspective view according to another angle of the same fitting, FIG. 5 represents a schematic and cross-sectional view according to the axis BB of FIG. 6 of the same fitting, FIG. 6 represents a schematic and cross-sectional view according to the axis AA of FIG. 5 of the same fitting.

DETAILED DESCRIPTION OF THE PREFERRED EMBODIMENTS

Figures 7, 8:
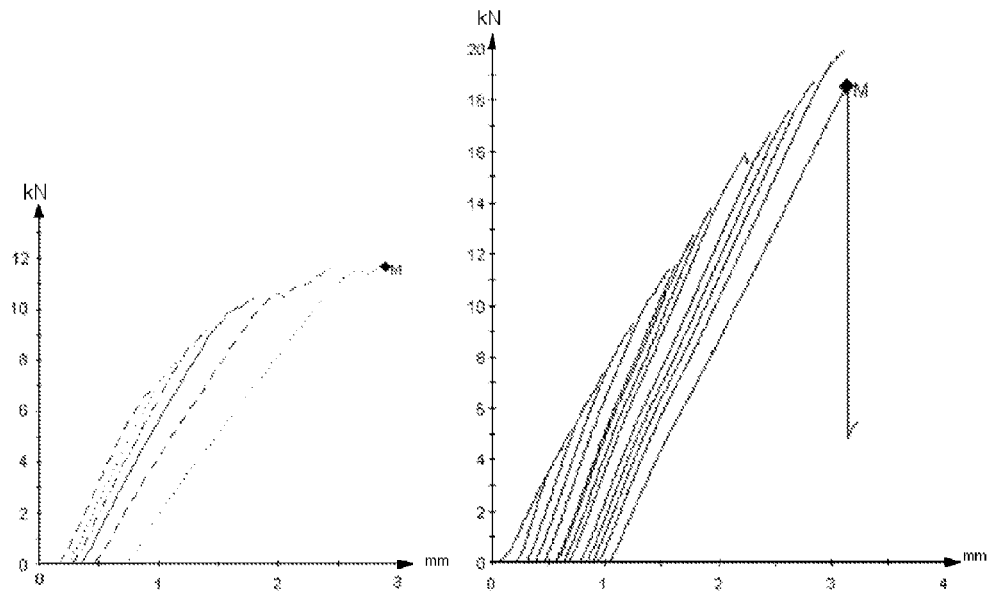
FIGS. 7 and 8 represent results of tensile tests on fittings.

In FIGS. 3. 4. 5 and 6, one can see an L-shaped fitting 2 according to the invention. This fitting 2 comprises two portions 20 and 21 forming between them an angle, in this case a right angle, having holes 22 and 23, respectively, formed therein, and at right angles by means of side reinforcements 24.

Though the portion 20 is flat, the portion 21 has, in turn, a curved profile, which creates two deformations 25 in the form of a spherical cap, which is concave on the inner side and convex on the outer side, and at the pole of each one of which is drilled a hole 23 with an axis radial to the deformations 25 permitting the passing-through of a fixing means, not shown, for example the screw of a bolt. FIGS. 4 and 5 show the deformation 25 forming the second inner surface 25a. FIG. 5 shows the radius 25b of the second inner surface 25a in a dashed line.

It should be noted that the selection of the location of the holes 23 depends on the use of the fitting 2 and especially on the directions of the forces it has to withstand, since the location of a hole 23 is characterized by an axis. In this case, for the fitting 2 shown, the selection of the poles is a particular case.

It should be noted in addition that it is advantageously possible for the axes of the holes 23 not to be parallel.

Furthermore, the side reinforcing portions 24 also have an internally concave and externally convex curved profile.

It should be noted that the area or transition area 26 for connecting the two portions 20 and 21 to each other has an internally concave and externally convex curved profile through which occurs the transmission of the forces from one portion onto the other one. FIG. 4 shows the transition area 26 between the portions 20 and 21. The fibers, which in this area connect both portions 20 and 21, follow a curvature and permit the pressure transfer.

In order to measure the advantages of the fitting 2 with respect to a fitting 1 made out of composite material and presently used, they have been subjected to comparison tests, which will now be described.

It should be noted first of all that the fittings 1 and 2 used during these tests have been molded with fabrics from one and the same badge and using the same number of plies for the same thickness and with the same method, polymerized according to the same thermal cycle. While increasing successive pressures are applied during the tests, in order to visualize the state of the fitting at each level of pressure.

The first tests consist in examining the behavior of the fittings 1 and 2 during tensile forces.

In FIG. 7 has been shown the graphic reproducing the results of the tensile tests on a fitting 1.

It should be noted that the offset of the starting point of each curve corresponds to the taking up of the backlash of the traction machine after each release, and that the curves of the first five rises in pressure are not reproduced.

The first cracks, referred to as first damages, are audible during the $6^{th}$ rise in pressure, starting from about 5400 N, without visual degradation of the fitting. From that pressure on, the fitting will <<crunch>> nearly continuously, which corresponds to the breaking of the fibers. For the following tractions, the cracking always restarts only from the preceding level of pressure. One observes on the various curves a change in slope, which corresponds to a decrease in rigidity, resulting from the breaking of the fibers. Starting from about 9000 N, the cracks intensify, however without showing visual breaking, delamination or irreversible deformation.

At about 10500 N, the fitting largely deforms, but this deformation is however reversible. At 11500 N, one observes the same deformation, however this time it is irreversible, while at 11600 N breaking occurs.

In FIG. 8 has been shown the graphic reproducing the results of the tensile tests on a fitting 2 according to the invention.

The first cracking occurs at about 15500 N, without showing any damage. Starting from this pressure, the fitting 2 behaves in the same way as the fitting 1, restarting of the cracking from the preceding level of pressure, and reduction of the rigidity.

The first visible defect appears at about 19900N, this is a delamination, which is visible only under pressure, and visually disappears when the force is released, then, at 18500N the fitting breaks.

Figures 9, 10:
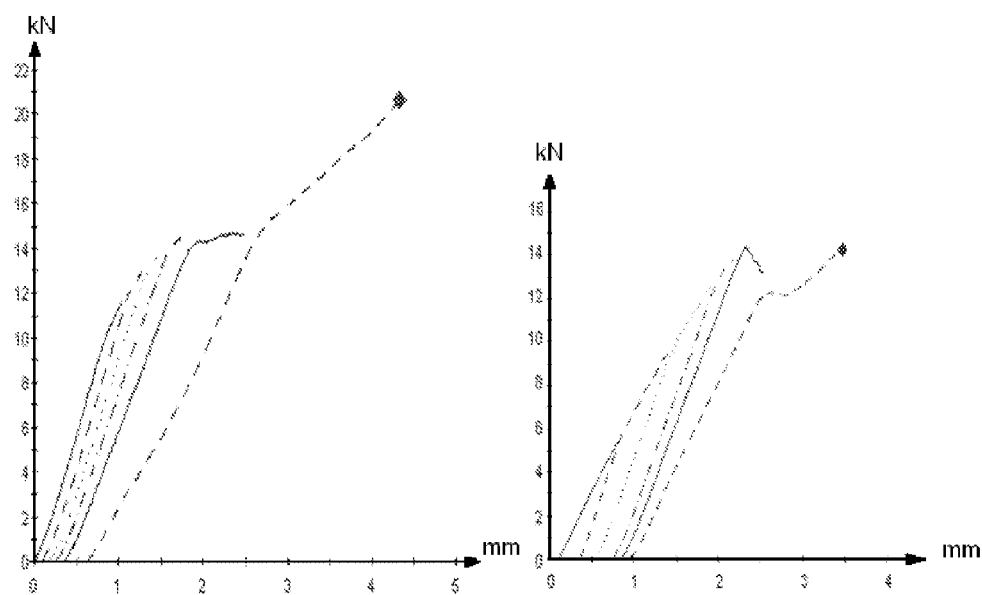
FIGS. 9 and 10 represent results of compression tests on fittings.

In FIG. 9 has been shown the graphic reproducing the results of the compression tests on a fitting 1.

On each fitting are applied increasing successive pressures, in order to visualize the state of the fitting at each level of pressure. The offset of the starting point of each curve corresponds to the taking up of the backlash of the traction machine after each release.

The first cracks appear at about 11400 N, they continue, without visible consequences, until 13500 N, then at 13700 N collapsing occurs.

In FIG. 10 has been shown the graphic reproducing the results of the compression tests on a fitting 2 according to the invention.

The first cracks appear at about 12500 N, without showing any damage. Starting from this pressure, the cracks restart from the maximum pressure of the preceding test. No visible damage is observed until the fifth test, or at about 13800 N an important delamination occurs, the following test confirming that the fitting is destroyed.

The following table summarizes the results obtained:

|  | Fitting 1 | Fitting 2 | U |
|---|---|---|---|
| MASS | 22 | 16 | g |
| Tensile strength | 10500 | 19900 | N |
| Crushing strength | 13500 | 13800 | N |

One can thus observe that the fitting 2 according to the invention has much higher tensile strength characteristics than a fitting 1, but that the crushing strength characteristics are identical.

It should be noted that in the studied cases the fitting 2 has a smaller mass than the fitting 1, so that it can be considered that at the same weight, by making the wall thicker, the fitting 2 can exhibit an eventually proportional increase of its tensile strength characteristics, both the tensile and the compression strength.

Figure 11:
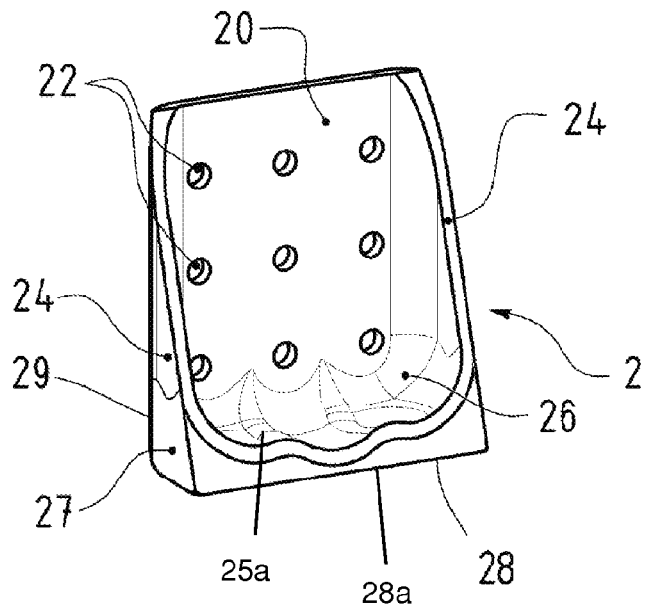
FIG. 11 represents a schematic and perspective view of a variant of the L-shaped fitting according to the invention.

When referring now to FIG. 11, one can see a variant of the L-shaped fitting 2, which consists of a fitting 2 on the portion 21 of which has been molded a heel 27, which has externally a flat coupling face 28, in this case perpendicular to the flat outer face 29 of the portion 20. The heel 27 is made integral with the second portion 21, and the flat coupling face 28 has the second outer surface 28a opposite the second inner surface 25a.

The portion 21 maintains its concavity on the inner side, as well as the area 26 for connecting the two portions 20 and 21. By contrast, the compression surface is flat, which avoids the use of elements with a spherical or cylindrical bearing face, such as washers with an adapted shape, for creating the interface on the outer side.

From the production point of view, the heel 27 is molded at high pressure onto the portion 21 of the fitting 2, after the latter has been produced. Thus, the fitting 2 maintains the same architecture, the heel 27 forming an interface.

Figure 12:
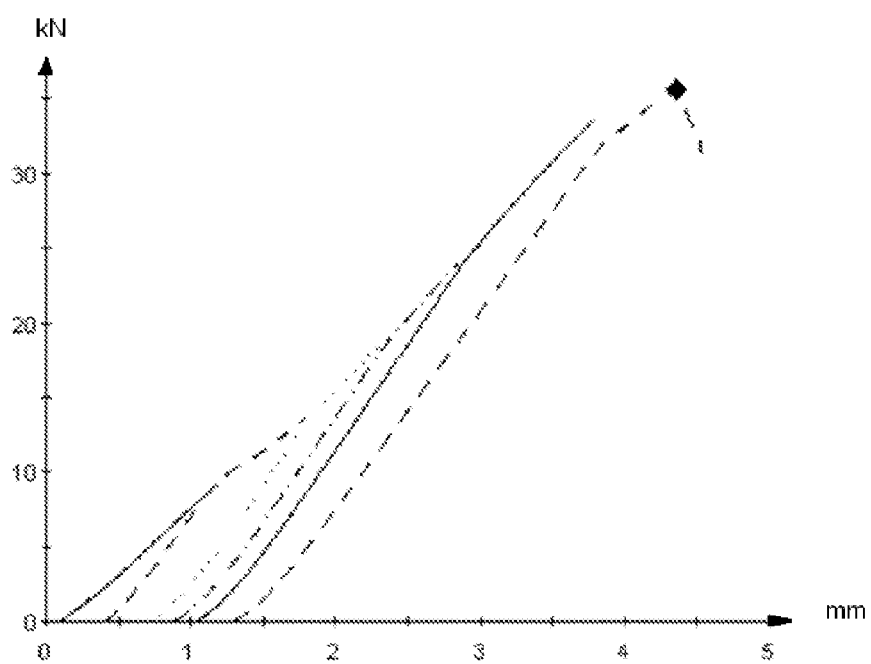
FIG. 12 represents the results of compression tests on the fitting shown in FIG. 11.

Such a fitting 2 provided with a heel 27 has been tested under the same conditions as the fittings 1 and 2 without a heel. The tensile tests provided the same results as those performed on a fitting 2 without a heel. The results of the crushing tests are given in the graphic of FIG. 12.

The first cracks are perceived at about 33000 N at the fifth test, while breaking occurs at 35000 N. The following table summarizes the results obtained:

|  | Fitting 1 | Fitting 2 with heel | U |
|---|---|---|---|
| MASS | 22 | 21 | g |
| Tensile strength | 10500 | 19900 | N |
| Crushing strength | 13500 | 33500 | N |

One can thus observe the superiority of the performances of fitting 2 with a heel 27 according to the invention, though it has, in this case, a smaller mass than the tested fitting 1.

Figure 13:
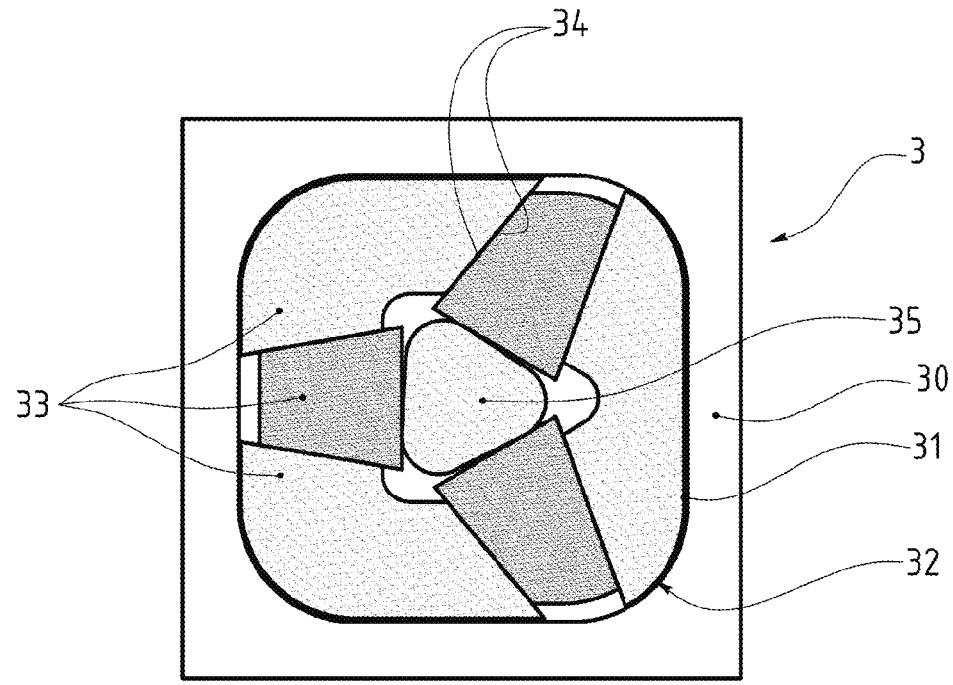
FIGS. 13 and 14 represent schematic plan views of a mold for producing an L-shaped fitting according to the invention.
Figure 14:
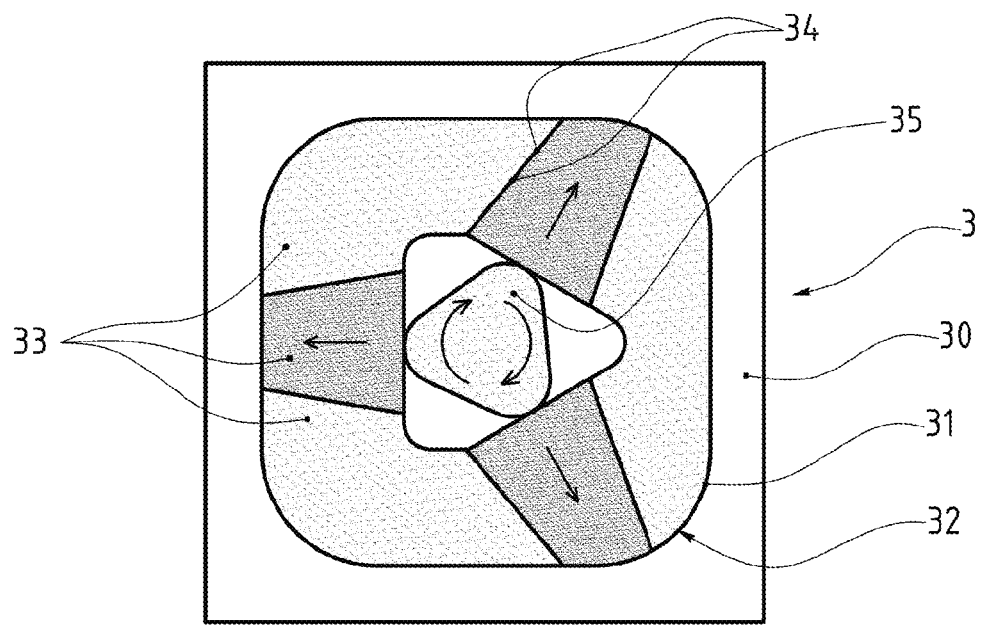

When referring now to FIGS. 13 and 14, one can see a mold 3 permitting to produce by molding a part according to the method for producing an inventive fitting 2.

The mold 3 includes, on the one hand, a portion 30 in which is provided for a hollow cavity 31 corresponding to the outer shape of the part to be molded and, on the other hand, a unit 32 of independent parts 33, movable with respect to each other, designed capable of sliding against each other through oblique surfaces 34, and which are assembled in a determined position permitting the unit 32 to reproduce the exact inner shape of the part to be molded, while some of these parts 33, which have a wedge shape, can, through the oblique surfaces, be pushed towards the interior of the unit 32, so as to permit a contraction of the unit 32.

It is obvious that during its use, the hollow cavity 31 is provided with a layer of pre-impregnated fibers in the form of fabrics or mats, then the unit 32, in contracted form, is inserted into the hollow cavity 31, finally the wedge-shaped elements 33 are pushed back towards the outside by means of a cam 35 so that the unit 32 adopts its expanded shape and thus presses the layer 5 of composite material.

It should be noted that this molding method and the mold permitting its implementation are not exclusively aimed at producing a fitting 2, but can perfectly be applied to the production of other objects.

What is claimed:

1. An L-shaped fitting obtained after molding a composite material, the fitting comprising:
    a first portion having a first hole, a first inner surface and a first outer surface, said first inner surface having a flat section;
    a second portion having a second hole, a second inner surface, and a second outer surface, said first portion and said second portion being made integral at a transition area, said first hole and said second hole being orthogonal to each other, said first inner surface facing said second inner surface; and
    side reinforcements being made integral with said first portion and said second portion and having a side section generally orthogonal to said flat section of said first inner surface,
    wherein said second inner surface is concave with a radius of curvature, different from a transition radius of curvature of said transition area, and wherein concavity of said second inner surface is adjacent to said transition area, said second hole being placed at said radius of curvature of said second inner surface.

2. The fitting according to claim 1, wherein said transition radius of curvature is less than said radius of curvature of said second inner surface, said transition area being curved around said first hole adjacent said transition area.

3. The fitting according to claim 1, wherein side reinforcements are concave with a side radius of curvature, said side radius of curvature being less than said radius of curvature of said second inner surface, said side reinforcements being curved around said first hole adjacent said transition area.

4. The fitting according to claim 1, wherein said first outer surface is flat, and wherein said second outer surface is flat.

5. The fitting according to claim 1, further comprising:
    a heel being attached to said second outer surface to form a flat surface, said second outer surface being convex, said heel being concave with a radius of curvature complementary to a radius of curvature of said second outer surface.

6. A method for forming an L-shaped fitting obtained after molding a composite material, the fitting comprising: a first portion having a first hole, a first inner surface and a first outer surface, said first inner surface having a flat section; a second portion having a second hole, a second inner surface, and a second outer surface, said first portion and said second portion being made integral at a transition area, said first hole and said second hole being orthogonal to each other, said first inner surface facing said second inner surface; and side reinforcements being made integral with said first portion and said second portion and having a side section generally orthogonal to said flat section of said first inner surface, wherein said second inner surface is concave with a radius of curvature, different from a transition radius of curvature of said transition area, and wherein concavity of said second inner surface is adjacent to said transition area, said second hole being placed at said radius of curvature of said second inner surface, said method comprising the steps of:
    arranging a layer pre-impregnated fibers on a mold with inner walls shaped corresponding to said first outer surface, said transition area, and said second outer surface;
    inserting a core within the inner walls;
    forming said first inner surface, said transition area, and said second inner surface on said layer facing said core, said second inner surface being formed concave with said radius of curvature different from a transition radius of curvature of said transition area, wherein concavity of said second inner surface is adjacent to said transition area;
    polymerizing said layer into a composite material by pressure and temperature conditions.

7. The method for forming the fitting, according to claim 6, further comprising the step of:
    attaching a heel to said second outer surface to form a flat surface, said second outer surface being convex, said heel being concave with a radius of curvature complementary to a radius of curvature of said second outer surface.

8. The method for forming the fitting, according to claim 6, wherein said step of forming said first inner surface, said transition area, and second inner surface on said layer facing said core comprises:
   sliding core elements against each other through oblique surfaces so as to contact said layer facing said core; and
   forming a wedge with said core elements, said wedge shaping said layer into said first inner surface, said transition area, and second inner surface.

\* \* \* \* \*